UNITED STATES PATENT OFFICE 2,635,528

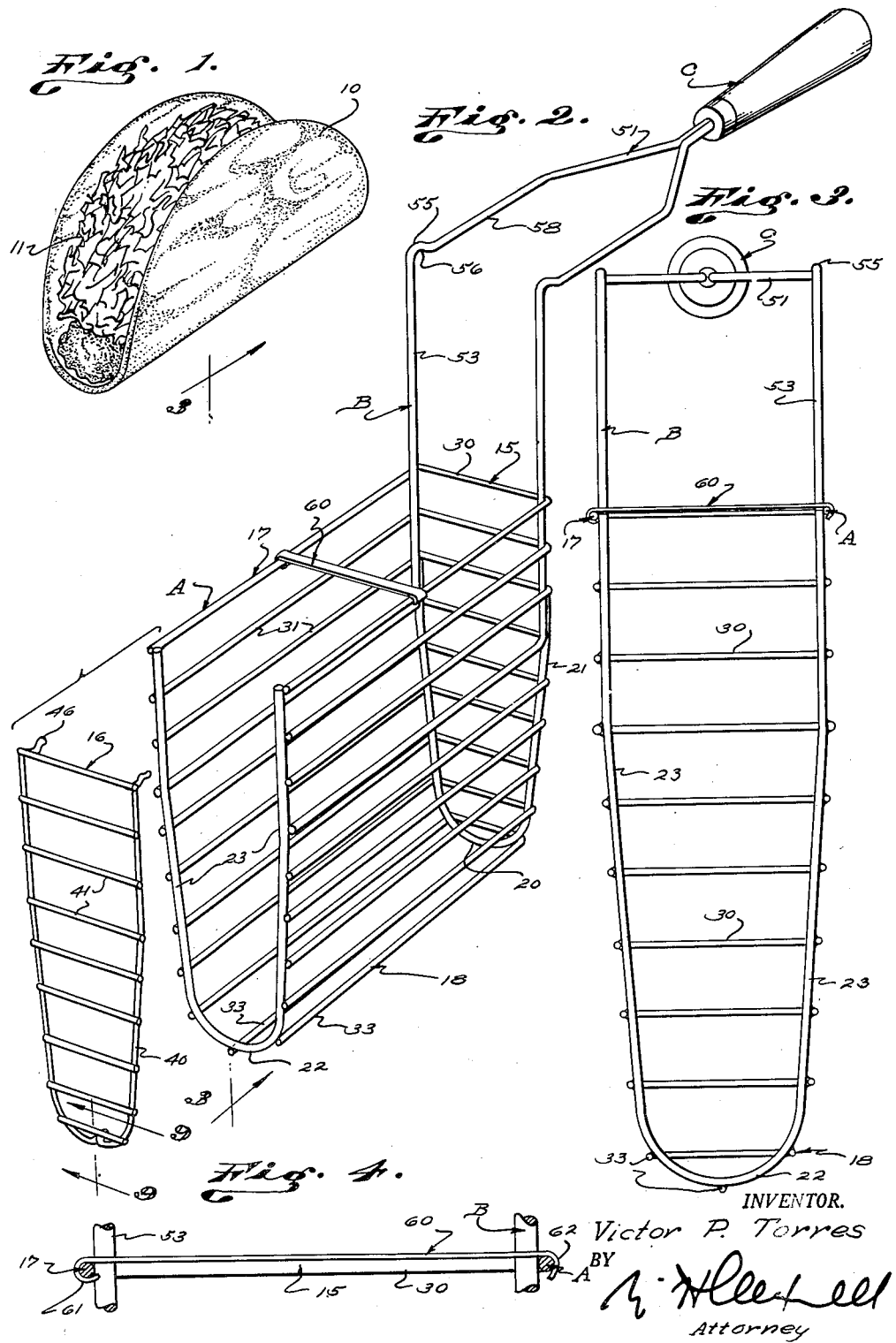

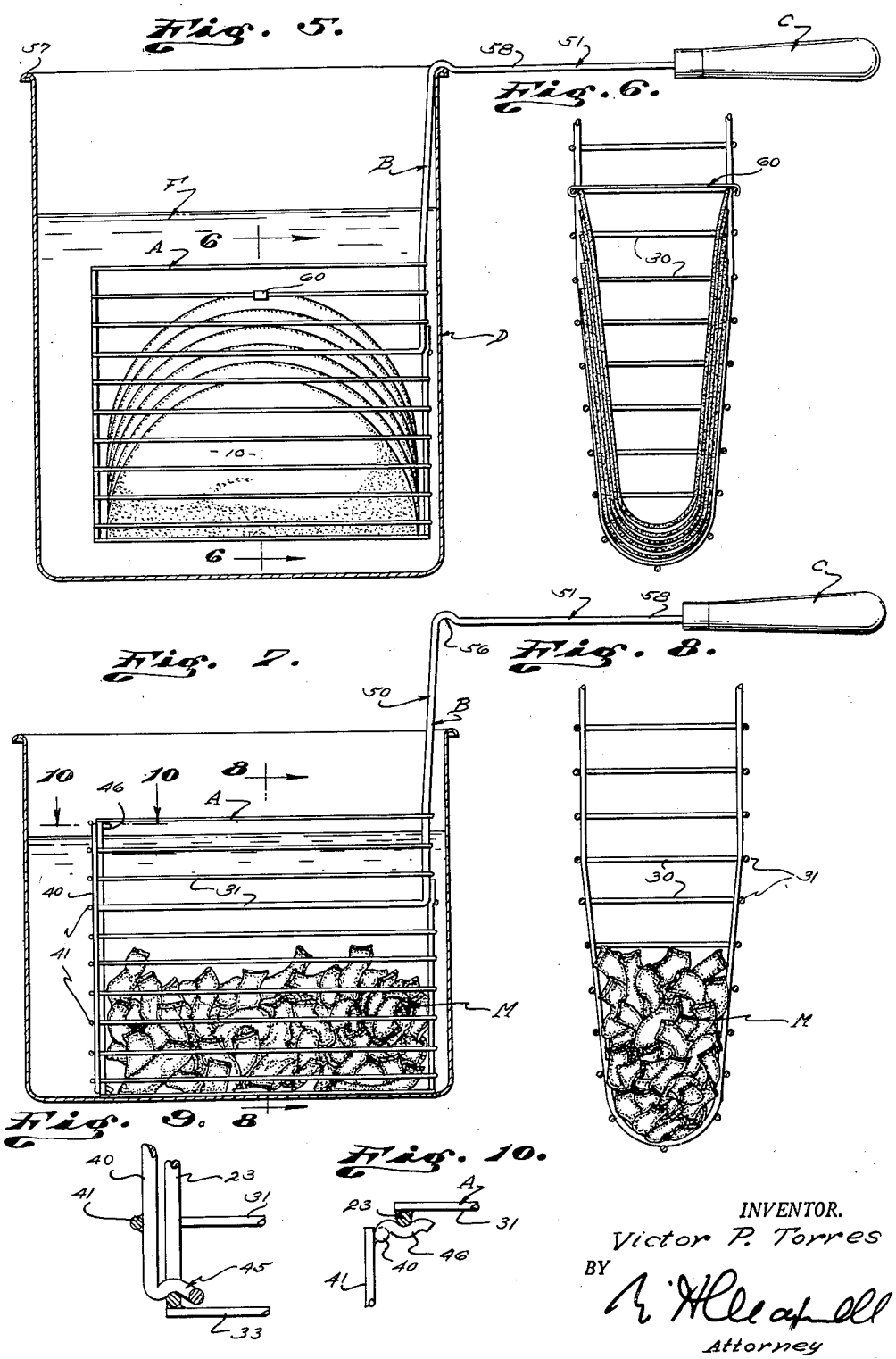

FRYING UTENSIL

Victor P. Torres, San Gabriel, Calif.

Application February 10, 1950, Serial No. 143,375

2 Claims. (Cl. 99—413)

This invention has to do with a cooking implement in the nature of a frying utensil, it being a general object of the invention to provide an article of manufacture that is simple and inexpensive of construction and which is practical and effective for the frying of food and particularly in the making of tacos shells.

The preparation of tacos involves frying of tortillas while held in a folded or U-shaped formation and when the tortillas are fried crisp they are removed from the oil or liquid in which they are fried and are supplied with a suitable filling. The frying operation just referred to is deep frying and with methods heretofore employed this operation has been somewhat difficult and tedious as it requires manual holding of the tortilla in the desired shape while frying, or the use of rather makeshift pans to hold the tortilla in proper shape. A difficult or limiting factor is the fragile nature of the tortilla when fried crisp, and because of this, ordinary methods of preparation have resulted in much breakage.

A general object of this invention is to provide a frying utensil that can be easily and conveniently used to handle one or more tortillas in a bath of oil or fat so that the tortillas are properly fried without constant holding or attention on the part of the cook and without danger of loss or breakage such as ordinarily attends the frying of tortillas.

A further object of this invention is to provide a utensil of the general character referred to which is simple and inexpensive of manufacture and which is convenient to handle and is such that it can be easily maintained in clean working condition.

Another object of the invention is to provide a utensil of the general character referred to involving a body structure which will simultaneously handle a plurality of tortillas so that they are properly and thoroughly fried simultaneously and are readily removable after having been fried until they are crisp.

It is a further object of this invention to provide a utensil of the general character referred to which is such that it can be advantageously adapted to fry various foods thus making the utensil practical for a wide range of cooking operations.

The various objects and features of my invention will be fully understood from the following detailed description of a typical preferred form and application of the invention, throughout which description reference is made to the accompanying drawings, in which:

Fig. 1 is a perspective view illustrating a taco, which article of food involves a crisp fried tortilla containing a suitable filling. Fig. 2 is a perspective view of the utensil provided by the present invention and showing the outer end of the utensil body separate from the balance of the body. Fig. 3 is an end elevation of the utensil taken in the general direction indicated by line 3—3 on Fig. 2. Fig. 4 is an enlarged detailed transverse sectional view of a portion of the utensil taken at the retainer provided in connection with the body of the utensil. Fig. 5 is a view showing the utensil in use in the course of frying a plurality of tortillas being a sectional view of a frying vessel carrying a body of frying liquid in which the body of the utensil is submerged. Fig. 6 is a detailed transverse sectional view taken as indicated by line 6—6 on Fig. 5. Fig. 7 is a view similar to Fig. 5 showing another use of the utensil in which a shredded type product is carried in the body of the utensil and is submerged in a manner to be fried. Fig. 8 is an enlarged transverse sectional view taken as indicated by line 8—8 on Fig. 7. Fig. 9 is an enlarged detailed sectional view taken as indicated by line 9—9 on Fig. 2 and Fig. 10 is an enlarged detailed sectional view taken as indicated by line 10—10 on Fig. 2.

The present invention is primarily concerned with a utensil that can be used to advantage in the frying of tortillas for use in tacos. For purpose of illustration a taco is illustrated in Fig. 1 where a tortilla 10 is in U-shaped configuration having been fried so that it remains in that shape and is crisp while a filling 11 of suitable material or materials is contained in or between the sides of the tortilla.

The utensil provided by the present invention includes, generally, a body A, a shank B, and a handle C. The handle is provided for convenient manipulation of the utensil and the shank B serves to connect the handle C and the body A in such manner as to make the body readily applicable to a cooking vessel D, such as a pot containing a body of frying oil or fat F.

The body A is, in general, an elongate upwardly opening basket like structure substantially U-shaped in cross sectional configuration. It is preferred that the bottom of the body be rounded and that the sides thereof at least adjacent the bottom be flared or somewhat divergent so that a tortilla laid in the body to conform to the bottom and sides of the shape or is in the form desired in a taco. Further, it is preferred that the body be of such depth or vertical extent that a plurality of tortillas can be arranged within or one over the other so that a plurality of tortillas are simultaneously fried as the utensil is used.

In a typical structure, the body A involves, generally, an inner end 15, an outer end 16, sides 17, and a bottom 18. In the particular case illustrated, the body involves frame members at the ends thereof. A frame is provided at the inner end of the body and has a bottom portion 20 and posts 21 that project upwardly from the bottom portion. The bottom portion is curved, the post 21 projects upwardly from the ends of the bottom portion 20 and for a suitable distance above the bottom portion they flare or diverge slightly. In practice, the frame formed by the parts 20 and 21 may be formed of a heavy or rigid wire. The frame at the outer end of the body is formed by a bottom 22 and posts 23 that project upwardly from the bottom. It is preferred that the frame at the outer end of the body be such as to correspond in size and shape with that of the inner end of the body.

The inner end wall 15 of the body A is an open or grill construction such as to provide for free circulation of liquid. In the particular case illustrated the inner end wall 15 is formed of a plurality of bars 30 which extend between the posts 21 of the inner end frame. In the case illustrated the bars 30 are horizontally disposed and are spaced apart vertically, as clearly illustrated throughout the drawings. The side walls 17 of the body are preferably alike and are grill-like structures carried by and extending between the end frames of the body. In the particular case illustrated each side wall 17 involves a plurality of rails 31 that extend longitudinally of the body and which are horizontally disposed and spaced apart vertically. It is preferred that the number and spacing of rails 31 be the same in the two side walls 17. The bottom 18 corresponds in form or construction with the side walls 17 and involves longitudinally disposed rails 33 that extend between the end frames of the body. In practice, the bars 30 and the several rails above referred to are formed of wire and these various wires are preferably integrally joined as by welding to the end frames of the body, so that the body structure thus far described forms or is in the nature of a rigid integral unit.

The outer end wall 16 of the body which may or may not be used as circumstances require, is detachable or separable from the other portion of the body and in the case illustrated it is shown as being formed by a U-shaped frame 40 corresponding in size and shape with the outer end frame of the body and as having bars 41 extending between the vertical parts of the frame 40, the same as the bars 30 extend between the corresponding parts of the inner end frame of the body.

Suitable means are provided for releasably connecting or attaching the outer end wall 16 to the body so that the outer end of the body can be closed when desired. In the particular case illustrated a hook 45 is provided on the lower end portion of the outer end wall 16 and is engageable over the bottom 22 of the outer end frame. Catches or latch members 46 are provided at the upper end portion of the wall 16 and project therefrom to be engageable with posts 23 of the outer end frame of the body. From the drawings, and particularly from Figs. 2, 9 and 10 of the drawings, it will be apparent how the end wall 16 can be engaged with or removed from the plane of the body at will.

The shank B attaches to and projects from the body A that has been described and in its preferred form the shank has a vertical section 50 which attaches to the inner end of the body A and projects upwardly therefrom and horizontal section 51 which is joined to the upper end of the vertical section 50 and projects horizontally therefrom.

In the preferred construction illustrated in the drawings the vertical section of the shank is formed by legs 53 which join to and continue upward from the posts 21 of the inner end frame of the body. The legs may be integral extensions or continuations of the posts of the frame. The upper ends of the legs 53 are joined to the horizontal section by suitably curved or looped portions 55 which form downwardly facing notches 56 engageable with the rim 57 of a vessel D.

The horizontal section 51 of the shank is formed by arms 58 joined to the legs 53 by the parts 55. The arms 58 extend horizontally away from the legs in a direction opposite to that from which the body projects from the lower ends of the legs. In the case illustrated the arms extend parallel with each other a suitable distance from the legs and then converge and join to connect with the handle C. The handle may in practice be of any suitable form or construction, it being preferred to employ a handle of the general type or construction common to cooking implements or utensils of the general character to which this invention relates. In practice, the arms 58 are wire and are integral extensions or continuations of the legs 53 making the entire shank construction simple and inexpensive.

A retainer 60 is provided and can be used in connection with the body A if desired. The retainer, as shown in the drawings, is an elongate member of such length as to extend across the body from one side wall to the other and it is preferably separable or releasable from the body so that it can be applied to the body and used as desired. In the case illustrated the retainer 60 is shown provided at one end with an open hook-like part 61 that can be snapped over or around one of the rails of the body. At the other end the retainer has a latch part 62 that can be snapped over a rail at the opposite side of the body. With the body construction that I have provided the retainer can be applied at various positions vertically of the body and it can be applied so as to hold objects or material in the body, should it be found that they tend to float when submerged in a cooking liquid.

From the foregoing description and from Figs. 5 to 8 of the drawings, it is believed that the use of the utensil will be fully understood. When it is desired to employ the utensil to cook tortillas for use in tacos, the outer end wall of the body need not be used. A plurality of tortillas can be placed or arranged in the body in the manner clearly illustrated in Figs. 5 and 6 and to suitably fry such tortillas the body of the tortilla is submerged in the liquid F contained in the vessel D. When the tortillas are properly fried the body is removed and the tortillas can be successively removed therefrom to be filled in the desired manner. In Figs. 5 and 6 a retainer 60 provided by the invention is shown applied to the body to retain the tortillas therein so that they will not shift as the cooking operation is performed.

If it is desired to fry loose material such as a shredded or loose paste product it is desirable to apply the outer end wall 16 of the body to the outer end of the body so that the body forms a basket that will effectively hold material M such as is shown in Figs. 7 and 8 of the drawings. When the implement is thus used the body will serve to handle material in a dependable and satisfactory manner.

Having described only a typical preferred form and application of my invention I do not wish to be limited or restricted to the specific details herein set forth, but wish to reserve to myself any variations or modifications that may appear to those skilled in the art and fall within the scope of the following claims.

Having described my invention, I claim:

1. A cooking utensil of the character described including, an upwardly opening elongate body, a shank projecting from the body, and a handle on the shank, the body including a rigid unit having sides, a bottom and an inner end, an outer end, and means releasably connecting the outer end to the outer end of said unit including a hook on the outer end engageable with the unit and a post having latch engagement with the unit.

2. A cooking utensil of the character described including, an upwardly opening elongate body, a shank projecting from the body, and a handle on the shank, the body including U-shaped end frames each with a bottom and posts projecting upwardly from the bottom, and sides including, a plurality of straight, substantially horizontal rails carried by and extending freely between the posts of the frames, the shank including substantially vertical spaced legs projecting up from the posts of one end frame, and arms projecting horizontally from the upper ends of the legs and converging to the handle.

VICTOR P. TORRES.

References Cited in the file of this patent

UNITED STATES PATENTS

| Number | Name | Date |
|---|---|---|
| 323,339 | Kilborn | July 28, 1885 |
| 516,557 | Stone | Mar. 13, 1894 |
| 624,356 | Lurie et al. | May 2, 1899 |
| 795,298 | McCaughot | July 25, 1905 |
| 797,871 | Smith | Aug. 22, 1905 |
| 873,589 | Parry | Dec. 10, 1907 |
| 892,020 | Walburn | June 30, 1908 |
| 923,756 | Attwell | June 1, 1909 |
| 937,372 | Higgins | Oct. 19, 1909 |
| 1,027,215 | Poppert | May 21, 1912 |
| 1,840,561 | Miller | Jan. 12, 1932 |
| 2,506,305 | Maldonado | May 2, 1950 |
| 2,528,776 | Pappas | Nov. 7, 1950 |
| 2,557,467 | Rodriguez | June 19, 1951 |